3,288,721
VANADIUM-PHOSPHORUS CATALYST
CONTAINING ALKALI METALS
Ralph O. Kerr, Houston, Tex., assignor to Petro-Tex Chemical Corporation, Houston, Tex., a corporation of Delaware
Filed Oct. 2, 1963, Ser. No. 313,187
5 Claims. (Cl. 252—435)

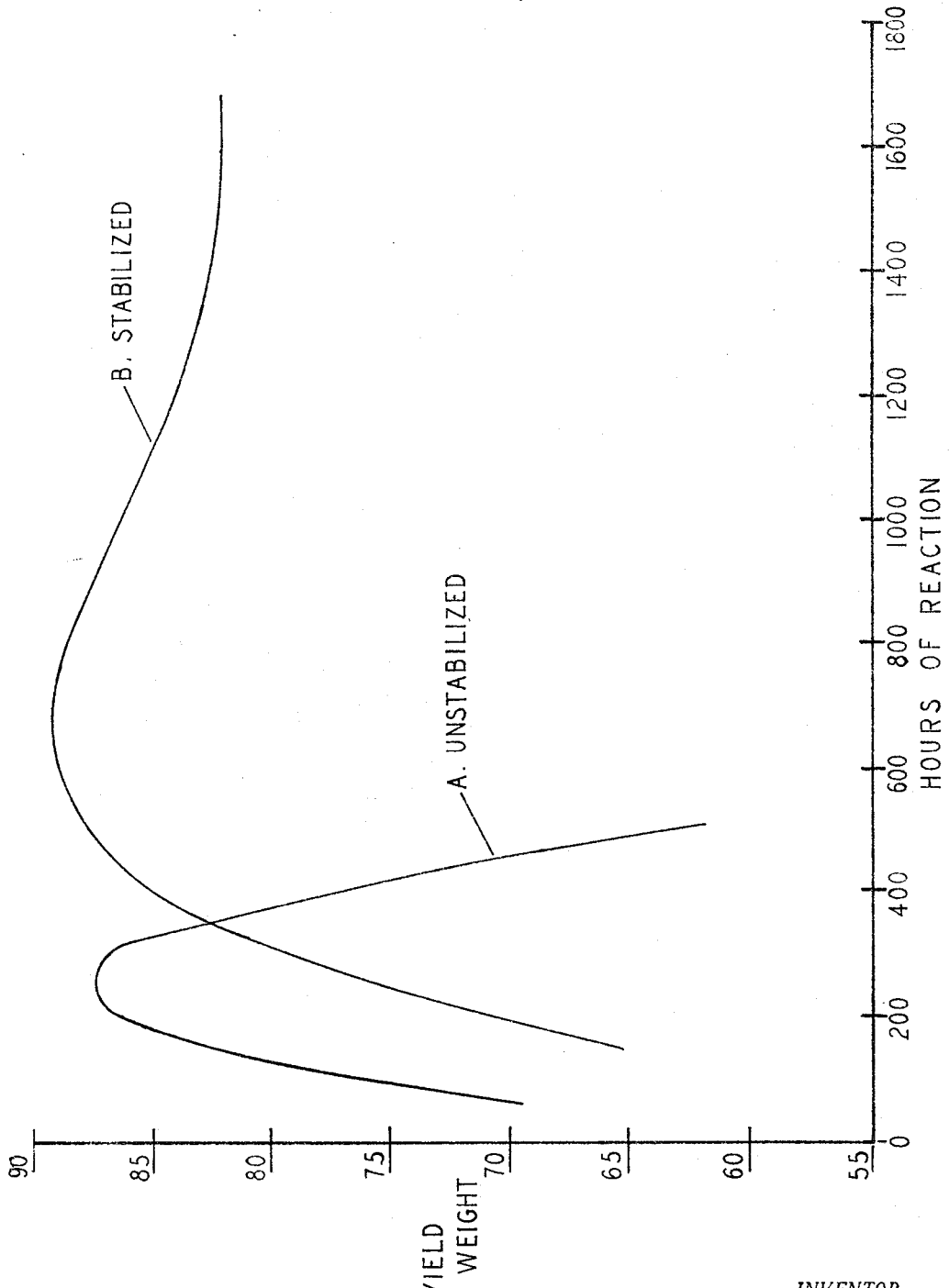

This invention relates to an improved composition of matter useful as a catalyst. These catalysts are particularly useful for vapor phase oxidations, such as the oxidation of hydrocarbons to dicarboxylic acid anhydrides. This application is a continuation-in-part of my earlier filed applications Serial Number 175,423, filed February 26, 1962, now abandoned, entitled, "Catalytic Oxidation of Hydrocarbons," Serial Number 175,756, filed February 26, 1962, now abandoned, entitled, "Catalytic Oxidation of Hydrocarbons," and Serial Number 783,134, filed December 29, 1958, entitled, "Catalytic Oxidation of Olefins to Dicarboxylic Acid Anhydride."

Although catalysts for the oxidation of butene to maleic anhydride have been suggested, these prior art catalysts have not proven to be satisfactory as commercial catalysts. Generally the catalysts have produced only low yields of product or have not had satisfactory catalyst life. It is one of the objects of this invention to provide improved catalysts for the oxidation of olefins to dicarboxylic acid anhydrides at high yields. It is also an object of this invention to provide an improved catalyst which is effective to produce high yields of dicarboxylic acid anhydrides for prolonged periods of time. According to this invention, it has been discovered that in the oxidation of hydrocarbons to dicarboxylic anhydrides the catalysts comprising particular ratios of vanadium, oxygen and phosphorus lose their catalytic activity due to the loss of phosphorus. It has further been discovered that the phosphorus may be stabilized by the addition of particular amounts of elements of Group Ia of the Periodic Table.* The elements of Group Ia are the alkali metal elements. The catalysts which have the phosphorus stabilized are effective to produce maleic anhydride for very long periods of time at high yields.

The catalysts comprising vanadium, oxygen, phosphorus and Group Ia atoms are chemically combined in a complex. It is difficult to determine the exact chemical arrangement of the atoms. Oxides of vanadium and phosphorus are present when the catalyst is being used to oxidize the hydrocarbons to maleic anhydride. The atomic ratio of the phosphorus and vanadium should be about 1.0 to 2.0 atoms of phosphorus per atom of vanadium. Expresssed in terms of the oxide, the ratio of $P_2O_5$ to $V_2O_5$ will be from about 1.0 to 2.0 mols of $P_2O_5$ per 1.0 mol of $V_2O_5$. Preferably, the ratio of atoms of phosphorus to atoms of vanadium will be from about 1.1 to 1.6 atoms of phosphorus per atom of vanadium. The atomic ratio of the total atoms of Group Ia elements to phosphorus should be between about 0.003 and 0.125 atom of Group Ia elements per atom of phosphorus. The best results have been obtained when the ratio of Group Ia atoms to phosphorus atoms has been from about 0.01 to 0.060 atom of elements of Group Ia per atom of phosphorus. When the Group Ia atom is introduced into the catalyst preparation in the form of a compound, for example, as lithium hydroxide or potassium chloride, the weight of the Group Ia metal compound will be from about 0.05 to about 5.0 weight percent of the total weight of the vanadium, phosphorus and oxygen. The atomic ratio of oxygen to the remaining components of the catalyst, when the catalyst is in the process of being used to catalyze the oxidation, is difficult to determine and is probably not constant due to the competing reactions of oxidation and reduction taking place during the reaction at the high temperatures. Perhaps at room temperature the ratio of oxygen to phosphorus may be about 2 to 5 atoms of oxygen per atom of phosphorus and the ratio of oxygen to vanadium may be from about 2 to 5 atoms of oxygen per atom of vanadium. The over-all ratio of oxygen to the combined atoms of vanadium and phosphorus at room temperature then would be about 4 to 10 atoms of oxygen per combined atoms of vanadium and phosphorus.

The advantage of the addition of a Group Ia stabilizer may be demonstrated by making comparative runs with and without the Group Ia phosphorus stabilizer. A vanadium-phosphorus catalyst complex was prepared with an atomic ratio of phosphorus to vanadium of about 1.3 atoms of phosphorus per atom of vanadium. This catalyst was used to oxidize butene to maleic anhydride with the results shown in run A of the graph. As may be seen from the graph, the catalyst initially gave high yields, but after 300 hours of operation the yield fell off sharply. Another catalyst was prepared which contained as a phosphorus stabilizer 0.4 weight percent of lithium hydroxide based on the total weight of vanadium, oxygen and phosphorus. The run was repeated using the stabilized catalyst and the results are plotted as run B on the graph. The marked increase in catalyst life is evident. Catalyst B is an excellent commerical catalyst. The details of these runs are set forth in Example 4 below and the data obtained is tabulated in that example.

The catalyst may be prepared in a number of ways. The catalyst may be prepared by dissolving the vanadium, phosphorus and alkali metal compounds in a common solvent, such as hot hydrochloric acid and thereafter depositing the solution onto a carrier. The catalyst may also be prepared by precipitating the vanadium and phosphorus compounds, either with or without a carrier, from a colloidal dispersion of the ingredients in an inert liquid. In some instances the catalyst may be deposited as molten metal compounds onto a carrier; however, care must be taken not to vaporize off any of the ingredients such as phosphorus. The catalyst may also be prepared by heating and mixing anhydrous forms of phosphorus acids with vanadium compounds and the alkali metal compound. The catalysts may be used as either fluid bed or fixed bed catalysts. In any of the methods of preparation heat may be applied to accelerate the formation of the complex. Although some methods of catalyst preparation are preferred, any method may be used which results in the formation of the catalyst complex containing the specified ratios of vanadium, phosphorus and alkali metal.

The preferred method to obtain catalysts which produce high yields of maleic anhydride upon oxidation of olefins is whereby the catalyst complex is formed in solution and deposited as a solution onto the carrier. This method is set forth in the parent application S.N. 783,134, filed December 29, 1958, which application is hereby incorporated by reference. According to one solution method, the vanadium is present in solution with an average valence of less than plus 5 in the finally formed complex in solution. Preferably the vanadium has an average valence of less than plus 5 at the time the solution of catalyst complex is deposited onto the carrier, if a carrier is used. The reduced vanadium with a valence of less than 5 may be obtained either by initially using a vanadium compound wherein the vanadium has a valence of less than 5 such as vanadyl chloride, or by

---

*References to the Periodic Table throughout this application and claims will be to a table as disclaimed in Smith's Introductory College Chemistry, third edition, by William F. Ehret, copyright 1950 by Appleton-Century-Crofts, Inc.

initially using a vanadium compound with a valence of plus 5 such as $V_2O_5$ and thereafter reducing to the lower valence with, for example, hydrochloric acid during the catalyst preparation to form the vanadium oxysalt, vanadyl chloride, in situ. The vanadium compound may be dissolved in a reducing solvent, such as hydrochloric acid, which solvent functions not only to form a solvent for the reaction, but also to reduce the valence of the vanadium compound to a valence of less than 5. For example, a vanadium compound, phosphorus compound and alkali metal compound may be dissolved in any order in a suitable reducing solvent and the formation of the complex allowed to take place. Preferably, the vanadium compound is first dissolved in the solvent and thereafter the phosphorus and alkali metal compounds are added. The reaction to form the complex may be accelerated by the application of heat. The deep blue color of the solution shows the vanadium has an average valence of less than 5. The complex formed is then, without a precipitation step, deposited as a solution onto a carrier and dried. In this preferred procedure, the vanadium has an average valence of less than plus 5, such as about plus 4, at the time it is deposited onto the carrier. Generally, the average valence of the vanadium will be between about plus 2.5 and 4.6 at the time of deposition onto the carrier.

When the above described solution method is employed, reducing agents for the vanadium may be either organic or inorganic. Acids such as hydrochloric, hydroiodic, hydrobromic, acetic, oxalic, malic, citric, formic and mixtures thereof such as a mixture of hydrochloric and oxalic may be used. Sulphur dioxide may be used. Less desirably, sulfuric and hydrofluoric acids may be employed. Other reducing agents which may be employed, but which have not been given as desirable catalysts are organic aldehydes such as formaldehyde and acetaldehyde; alcohols such as pentaerythritol, diacetone alcohol and diethanol amine. Additional reducing agents are such as hydroxyl amines, hydrazine, and nitric oxide. Nitric acid and similar oxidizing acids which would oxidize the vanadium from a valence of 4 to 5 during the preparation of the catalyst should be avoided. Generally the reducing agents form oxysalts of vanadium. For example, if $V_2O_5$ is dissolved in hydrochloric or oxalic acid, the corresponding vanadium oxysalts are produced. These vanadium oxysalts should have as the salt forming anion an anion which is more volatile than the phosphate anion.

According to this method, the time at which the alkali metal compound is incorporated into the solution is not critical so long as it is in solution before the catalyst complex is coated onto the carrier. The alkali metal compound may be added after the vanadium compound and the phosphorus compound have been reacted or the alkali compound may be added either before, at the same time, or after either the vanadium or phosphorus compound has been added.

Any vanadium, phosphorus and alkali metal compounds may be used as starting materials which when the compounds are combined and heated to dryness in air at a temperature of, for example, 350° C. will leave as a deposit a catalyst complex having relative proportions within the described ranges. In the solution methods, preferred are vanadium, phosphorus and alkali metal compounds which are essentially completely soluble in boiling aqueous hydrochloric acid at 760 mm. of mercury, containing 37 percent by weight hydrochloric acid. Generally, phosphorus compounds are used which have as the cation an ion which is more volatile than the phosphate anion, for example, $H_3PO_4$. Also, generally any vanadium compound which has as an anion an anion which is either the phosphate ion or an ion which is more volatile than the phosphate anion, for example, vanadyl chloride, may be used.

In this method, the catalyst complex containing vanadium, phosphorus and Group Ia elements may be formed by simply causing the combination of each of the ingredient components in a solution or dispersion. Heat may be applied to accelerate the formation of the complex and one method of forming the complex is by causing the ingredients to react under reflux conditions at atmospheric pressure. Under reflux conditions this solution reaction generally takes about one to two hours.

Although the catalysts prepared by this method may be separately formed and used as pellets, it is more economical and practical to deposit this material on a carrier such as aluminum oxide or silica. Before the carrier is combined with the catalyst the solution of catalyst is preferably concentrated to a solution which contains from about 30 to 80 percent volatiles and better results have been obtained when there is from about 50 to 70 percent volatiles by weight. The carrier may be added to the catalyst solution or the catalyst solution may be poured onto the carrier. Less desirably, the Alundum or other carrier may be present during the whole course of reactions to provide the desired vanadium-oxygen phosphorus-alkali metal complex. After the catalyst complex has been coated onto the carrier, the vanadium may be converted to a more active form by heating in the presence of an oxidizing gas.

Another example of the catalyst preparation is to mix with heating at a temperature of about 100° C. to 600° C. an anhydrous phosphoric acid such as ortho-phosphoric acid, pyrophosphoric acid, triphosphoric acid or meta-phosphoric acid with a vanadium compound such as vanadium pentoxide or ammonium metavanadate and an alkali such as potassium chloride. After the exothermic reaction between the igredients the catalyst may be used. The reaction mixture may be formed onto carriers or shaped into forms such as pellets prior to the reaction to form the catalyst.

Another example of the preparation of the catalyst complex is to dissolve the alkali metal compound and a vanadium compound such as ammonium metavanadate or vanadium pentoxide in an aqueous solution of phosphoric acid. After the components have been dissolved the solution is heated until precipitation occurs. The precipitant can then be dried and used as a catalyst, or a carrier may be combined with the liquid phase either before or after the precipitation.

In the various methods of preparation any vanadium, phosphorus and alkali metal compounds may be used as starting materials which when the compounds are combined and heated to dryness in air at a temperature of, for example, 350° C. will leave as a deposit a catalyst complex having relative proportions within the above described ranges.

The alkali metal may suitably be introduced by employing alkali metal compounds such as alkali metal salts with examples being lithium acetate, lithium bromide, lithium carbonate, lithium chloride, lithium hydroxide, lithium iodide, lithium oxide, lithium sulfate, lithium orthophosphate, lithium meta-vanadate, potassium sulfate, potassium chloride, potassium hydroxide, sodium chloride, sodium hydroxide, rubidium nitrate, cesium chloride and the like. Mixtures of two or more alkali metal compounds may be used, such as a mixture of lithium hydroxide and sodium chloride or a mixture of lithium chloride and potassium chloride. The preferred alkali metal elements are lithium, sodium and potassium, and mixtures thereof, with lithium being particularly preferred. When the above described preferred solution method of catalyst preparation is employed, the alkali metal compound will suitably be an alkali metal compound which either has a phosphate anion as the anion, that is a compound such as lithium phosphate, or a compound which has an anion which is more volatile than the phosphate anion.

As the source of phosphorus, various phosphorus compounds may be used, such as metaphosphoric acid, triphosphoric acid, pyrophosphoric acid, ortho-phosphoric acid, phosphorus pentoxide, phosphorus oxyiodide, ethyl phosphate, methyl phosphate, amine phosphate, phosphorus pentachloride, phosphorus trichloride, phosphorus oxybromide and the like.

Suitable vanadium compounds useful as starting materials are compounds such as vanadium pentoxide, ammonium metavanadate, vanadium trioxide, vanadyl chloride, vanadyl dichloride, vanadyl trichloride, vanadium sulfate, vanadium phosphate, vanadium tribromide, vanadyl formate, vanadyl oxalate, metavanadic acid, pyrovanadic acid, and the like.

The catalyst support, if used, provides not only the required surface for the catalyst, but gives physical strength and stability to the catalyst material. The carrier or support normally has a low surface area, as usually measured, from about .001 to about 5 square meters per gram. A desirable form of carrier is one which has a dense non-absorbing center and a rough enough surface to aid in retaining the catalyst adhered thereto during handling and under reaction conditions. The carrier may vary in size but generally is from about 2½ mesh to about 10 mesh in the Tyler Standard screen size. Alundum particles as large as ¼ inch are satisfactory. Carriers much smaller than 10 to 12 mesh normally cause an undesirable pressure drop in the reactor, unless the catalysts are being used in a fluid bed apparatus. Very useful carriers are Alundum and silicon carbide or Carborundum. Any of the Alundums or other inert alumina carriers of low surface may be used. Likewise, a variety of silicon carbides may be employed. Silica gel may be used. The amount of the catalyst complex on the carrier is usually in the range of about 10 to about 30 weight percent of the total weight of complex plus carrier and preferably from about 14 to about 24 weight percent on an inert carrier such as Alundum. The amount of the catalyst complex deposited on the carrier should be enough to substantially coat the surface of the carrier and this normally is obtained with the ranges set forth above. With more absorbent carriers, larger amounts of material will be required to obtain essentially complete coverage of the carrier. In the case of silicon carbide, about 25 percent of catalyst is normally used. Excess catalyst over that required to coat the carrier surface is not necessary and usually will be lost by mechanical attrition. In a fixed bed process the final particle size of the catalyst particles which are coated on a carrier will also preferably be about 2½ to about 10 mesh size. The carriers may be of a variety of shapes, the preferred shape of the carriers is in the shape of cylinders or spheres. Although more economical use of the catalyst on a carrier in fixed beds is obtained, as has been mentioned, the catalyst may be employed in fluid bed systems. Of course, the particle size of the catalyst used in fluidized beds is quite small, usually varying from about 10 to about 150 microns, and in such systems the catalyst normally will not be provided with a carrier but will be formed into the desired particle size after drying from solution.

Inert diluents such as silica may be present in the catalyst, but the combined weight of the essential active ingredients of vanadium, oxygen, phosphorus and alkali metal should preferably consist essentially of at least about 50 weight percent of the composition which is coated on the carrier, if any, and preferably these components are at least about 75 weight percent of the composition coated on the carrier, and more preferably at least about 95 weight percent. If desired, any remainder other than the atoms of vanadium, oxygen, phosphorus and alkali metal may be any essentially inert non-catalytic ingredient intimately combined with the vanadium, oxygen, phosphorus and alkali metal as a part of the coating on the carrier.

The oxidation of the olefin to aliphatic dicarboxylic anhydride may be accomplished by contacting the olefin in low concentrations in oxygen with the described catalyst. Air is entirely satisfactory as a source of oxygen, but synthetic mixtures of oxygen and diluent gases, such as nitrogen, also may be employed. Air enriched with oxygen may be employed.

The gaseous feed stream to the oxidation reactors normally will contain air and about 0.5 to about 2.5 mol percent hydrocarbons such as butene. About 1.0 to about 1.5 mol percent of the monoolefin are satisfactory for optimum yield of product for the process of this invention. Although higher concentrations may be employed, explosive hazards may be encountered. Concentrations of butene-2 less than about one percent, of course, will reduce the total yields obtained at equivalent flow rates and thus are not normally economically employed. The flow rate of the gaseous stream through the reactor may be varied within rather wide limits but a preferred range of operations is at the rate of about 50 to 300 grams of olefin per liter of catalyst per hour and more preferably about 100 to about 250 grams of olefin per liter of catalyst per hour. Residence times of the gas stream will normally be less than about 4 seconds, more preferably less than about one second, and down to a rate where less efficient operations are obtained. The flow rates and residence times are calculated at standard conditions of 760 mm. of mercury and at 25° C.

A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. The oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat exchange medium may be kept at the proper temperature by heat exchangers and the like. The reactor or reaction tubes may be iron, stainless steel, carbon-steel, nickel, glass tubes such as Vycor and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of the active catalyst present.

The temperature of reaction may be varied within some limits, but normally the reaction should be conducted at temperatures within a rather critical range. The oxidation reaction is exothermic and once reaction is underway, the main purpose of the salt bath or other media is to conduct heat away from the walls of the reactor and control the reaction. Better operations are normally obtained when the reaction temperature employed is no greater than about 100° C. above the salt bath temperature. The temperature in the reactor, of course, will also depend to some extent upon the size of the reactor and the olefin concentration. Under usual operating conditions, in compliance with the preferred procedure of this invention, the temperature in the center of the reactor, measured by thermocouple, is about 375° C. to about 550° C. The range of temperature preferably employed in the reactor, measured as above, should be from about 400° C. to about 515° C. and the best results are ordinarily obtained at temperatures from about 420° C. to about 500° C. Described another way, in terms of salt bath reactors with carbon steel reactor tubes about 1.0 inch in diameter, the salt bath temperature will usually be controlled between about 350° C. to about 550° C. Under normal conditions, the temperature in the reactor ordinarily should not be allowed to go above about 550° C. for extended lengths of time because of decreased yields and possible deactivation of the novel catalyst of this invention.

The pressure on the reactor is not generally critical, and the reaction may be conducted at atmospheric, superatmospheric or below atmospheric pressure. The exit pressure will be at least slightly higher than the ambient pressure to insure a positive flow from the reaction. The pressure of the inert gases must be sufficiently high to overcome the pressure drop through the reactor.

The dicarboxylic acid anhydrides may be recovered by a number of ways well known to those skilled in the art. For example, the recovery may be by direct condensation or by adsorption in suitable media, with subsequent separation and purification of the dicarboxylic acid anhydride.

The catalysts of the present invention and the process of using them are useful for the production of aliphatic dicarboxylic acid anhydrides. Hydrocarbons of from 4 to 6 carbon atoms are useful starting materials. The preferred starting materials are the four carbon hydrocarbons such as butene-1, cis or trans butene-2 and butadiene-1,3 and mixtures thereof. Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly $C_4$ hydrocarbon stream may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Although various mixtures of hydrocarbons are useful, the preferred hydrocarbon feed contains at least 70 weight percent butene-1, butene-2 and/or butadiene-1,3 and mixtures thereof, and more preferably contains at least 95 percent butene-1, butene-2 and/or butadiene-1,3 and mixtures thereof. Any remainder usually will be aliphatic hydrocarbons.

The aliphatic dicarboxylic acid anhydrides, such as maleic anhydride, have many well known commercial uses such as a modifier for phthalic anhydride-glycerol alkyd resins.

Although the catalysts of this invention have been described as being particularly useful for the oxidation of hydrocarbons to dicarboxylic anhydrides, they have many other uses such as a catalyst for the oxidation of aldehydes to acids, and for the oxidation of olefins to aldehydes, and so forth.

*Example 1*

A catalyst for oxidation of butene-2 to maleic anhydride was prepared as follows. 51.7 grams of vanadium pentoxide, $V_2O_5$, was added to 800 milliliters of aqueous hydrochloric acid, containing 37 percent HCl. The mixture was warmed slowly and after the initial reaction the mixture was refluxed for 10 to 16 hours. After a blue solution was obtained showing that a homogeneous complex of vanadium oxychloride was formed 78.5 grams of 85.9 weight percent phosphoric acid was added to the mixture and the mixture again refluxed. The resulting deep blue solution containing some vanadyl acid phosphate was evaporated to about 200 milliliters and the container placed in a mixing device. To the hot solution was added 400 grams of extracted Alundum. The extracted Alundum, 4 to 8 mesh, which contained 87.8 percent aluminum oxide, 11.2 percent silicon oxide, 0.3 percent ferric oxide, 0.3 titanium oxide and 0.1 percent each of calcium oxide, sodium oxide and potassium oxide by chemical analysis, had a bulk density of 1.9 grams per cubic centimeter and less than one square meter per gram surface as measured by nitrogen absorptions; was extracted with concentrated hydrochloric acid, washed with distilled water and dried in an oven at 150° C. Deposition of the vanadium-phosphorus complex on the Alundum was carried out by combined heating and stirring at a temperature to obtain slow and gradual drying of the material. After about an hour a free flowing catalytic material was obtained which had the catalyst complex uniformly deposited on the surface of the Alundum. The coated Alundum contained 20 weight percent catalyst complex of an atomic ratio of 1.0 vanadium to 1.2 phosphorus.

*Example 2*

300 milliliters of the unstabilized catalyst of Example 1 was packed in a 3 foot carbon steel tube, ¾ inch inside diameter, with inert ¼ inch Alundum pellets on top of the catalyst material to a height ⅓ of the height of the catalyst. The reactors were encased in a 7 percent sodium nitrate-40 percent sodium nitrite-53 percent potassium nitrate eutectic mixture constant temperature salt bath. The reactor was slowly warmed to 500° C. while passing a gas stream containing 0.7 mol percent butene-2 in air through the catalyst bed. The reactor bottom pressure was maintained at 1 p.s.i.g. After the reactor had reached 500° C., the catalyst was aged by passing the butene-2 air mixture therethrough for 24 hours. The salt bath temperature was then lowered to 460° C. The butene-2 concentration in the reactor feed stream was increased to 1.25 mol percent and collection of maleic anhydride product begun. The salt bath temperature was adjusted to optimum yield of maleic anhydride, 480° C. in this case, and held at that temperature. The residence time of the gas stream passing through the reactor was less than about one second, calculated at 0.16 second reaction conditions. The exit gases from the reactor were cooled to about 50° C. at about ½ p.s.i.g. Under this condition, about 58 percent of the maleic anhydride dropped out of the gas stream. About 75 percent of the maleic anhydride in the reactor effluent is recovered by condensation. A water scrubber recovery and subsequent fractionation were used to recover and purify the remaining maleic anhydride in the gas stream after condensation. The combined maleic anhydride recovered is purified and recovered at a temperature of about 140–145° C. overhead and 145° C. bottoms temperatures in a fractionator. The purified product had a purity of 99.9 percent maleic anhydride.

In this run at a flow rate of 100 grams butene-2 per liter of catalyst per hour, a salt bath temperature of 480° C., pressure at reactor inlet of 9 p.s.i.g., pressure at reactor outlet of 1 p.s.i.g., a weight percent yield of maleic anhydride of 87 was obtained. This flow rate is equivalent to a space velocity of 35 to 40 liters of butene-2 S.T.P. per liter catalyst hour. After several weeks continuous operations under these conditions, the yield of maleic anhydride decreased about ten percent.

*Example 3*

When Example 2 is repeated with a catalyst prepared as described in Example 1 with the additional step of dissolving 1.2 grams of lithium hydroxide in the vanadium oxychloride prior to addition of the phosphoric acid, this catalytic material, at a flow rate of 92 grams of butene-2 per liter of catalyst per hour at a salt bath temperature of 490° C., gives a yield of maleic anhydride of 93 percent and retained this level of conversion even after 1200 hours continuous operation. Excellent results are also obtained at flow rates of 50 and 150 grams of butene-2 per liter hour of catalyst.

*Example 4*

Following the general procedure of Example 1, three portions of catalyst were made up having atomic ratios of phosphous to vanadium of 1.2, 1.35, and 1.4. The catalyst contained no phosphous stabilizer. All of the catalysts contained 23 percent actives on the inert pellets of 4 to 8 mesh size. A ¾-inch iron pipe, 6 feet long, was used as the reactor. Into the bottom of the reactor was charged 200 milliliters of catalyst containing a phosphorus to vanadium ratio of 1.2. On top of this charge were added 200 milliliters of the catalyst having a phosphorus to vanadium ratio of 1.35, and finally 200 milliliters of the catalyst having a phosphorus to vanadium ratio of 1.4 were added. The feed to the reactor contained about 60 percent cis-butene-2, 30 percent trans-butene-2, 1 percent butene-1, 3 percent butadiene, with the remainder being aliphatic hydrocarbons such as n-butene and isobutylene. A gaseous mixture containing air and 1.1 volume percent of the hydrocarbon based on the total mixture was fed to the reactor. The rate of feed of hydrocarbon was 92 grams of hydrocarbon per liter of catalyst per hour. The maximum yield was obtained at a salt bath temperature of 490° C. This catalyst gave high initial yields. The yield of maleic anhydride was about 70 percent after 55 hours, and went up to 87.5 percent at 200 hours. However, after about 300 hours the yield obtained from the catalyst fell off sharply. This data is given below in column A and is plotted as run A on the graph.

This run was repeated with the exception that the catalyst additionally contained 0.4 weight percent of lithium hydroxide based on the total weight of vanadium, oxygen and phosphorus. The atomic ratio of phosphorus to vanadium in the catalyst again varied from 1.2 at the bottom of the reactor to 1.4 at the top of the reactor, but only two portions of catalyst were used. The bottom of the reactor contained 300 milliliters of the catalyst having a phosphorus to vanadium ratio of 1.2, and the top of the reactor contained 300 milliliters of the catalyst having a phosphorus to vanadium ratio of 1.4. The same reactor tube was used and the same composition hydrocarbon feed was fed at the same rate of 1.1 volume percent. The data is recorded in column B below and is plotted as run B on the graph. Although the initial yield of maleic anhydride was not as high as the catalyst which did not have the phosphorus stabilized, at 355 hours the yield of the stabilized catalyst had risen to 83.1 percent maleic anhydride, which was the same as the yield produced by the unstabilized catalyst. Thereafter, the stabilized catalyst produced higher yields, with the yield going up to over 90 percent. Very high yields of maleic anhydride were produced even after 2000 hours of operation. The marked effect of the addition of the phosphorus stabilizer is illustrated in the graph.

| Column A—Unstabilized | | Column B—0.4% LiOH Stabilized | |
|---|---|---|---|
| Hours | Yield, Weight Percent | Hours | Yield, Weight Percent |
| 55 | 69.8 | 85 | 59.5 |
| 72 | 70.0 | 200 | 73.1 |
| 140 | 80.5 | 245 | 72.8 |
| 160 | 83.1 | 355 | 83.1 |
| 180 | 84.0 | 404 | 85.5 |
| 200 | 87.5 | 522 | 87.1 |
| 313 | 86.5 | 645 | 90.4 |
| 330 | 84.8 | 680 | 85.7 |
| 355 | 83.1 | 900 | 89.0 |
| 373 | 78.6 | 1,040 | 85.0 |
| 390 | 79.5 | 1,110 | 86.0 |
| 410 | 75.2 | 1,260 | 82.2 |
| 430 | 76.9 | 1,390 | 82.7 |
| 450 | 76.1 | 1,430 | 81.6 |
| 470 | 59.5 | 1,540 | 81.4 |
| 485 | 64.7 | 1,650 | 82.1 |
| | | 1,970 | 79.0 |
| | | 2,030 | 79.4 |
| | | 2,190 | 79.6 |

*Example 5*

Following the procedure of Example 2, a number of catalysts were tested containing varying ratios of $V_2O_5$ to $P_2O_5$, with the added lithium salt content being held constant at about one percent based on the total weight of vanadium, oxygen and phosphorus. At a flow rate of 135 grams butene-2 per liter of catalyst per hour, catalysts having 1 to 1.2 molar ratio of $V_2O_5$ to $P_2O_5$, 1 to 1.4 of $V_2O_5$ to $P_2O_5$ and 1 to 1.6 of $V_2O_5$ to $P_2O_5$, yields greater than 65 percent maleic anhydride over long periods of time are obtained. Likewise, when the flow rates were increased to 200 grams of butene-2 per liter of catalyst per hour, similar results are obtained. When these examples are repeated with catalysts containing 0.5 and 1.5 weight percent lithium chloride derived from lithium oxide and lithium hydroxide and lithium bromide, based on the weight of vanadium oxyphosphate or actives in the catalyst complex, similar excellent results are obtained in higher yields of the desired product, maleic anhydride, and catalysts with longer life at high efficiency. When these examples are repeated with sodium hydroxide and potassium hydroxide in place of lithium oxide, substantially increased catalyst life is also obtained.

*Example 6*

In this example the actives were prepared by dissolving 40 grams of an aqueous solution of $H_3PO_4$ containing 85% $H_3PO_4$ in about 80 cc. of distilled water, allowing the solution to cool to room temperature, then adding to the solution 25.4 grams of $NH_4VO_3$. Solution was brought about by stirring at room temperature. 400 grams of 6 to 8 mesh HCl leached Alundum pellets were added to the solution. The beaker containing the actives and Alundum supports was placed in a Glascol cylindrical heating mantle. The mixture of actives and supports was heated and stirred manually until the excess liquid had evaporated and the pellets were no longer sticky. The heat was then cut back by reducing the voltage to the mantle to 50 volts. The voltage to the mantle was raised 10 volts every 10 minutes until 110 volts was reached. After 15 minutes at 110 volts the catalyst was sieved to remove fines. The atomic ratio of phosphorus to vanadium was 1.6 to 1.0 and the catalyst contained 10 percent by weight of actives. No phosphorus stabilizer was used.

A metal block reactor was used to evaluate the catalyst. The reactor was made of nickel and was ¾ inch in diameter and about 1.5 feet long. The prepared catalyst was charged to the reactor in an amount of 150 ml. An aliphatic hydrocarbon composition containing approximately 95 volume percent of butene-2 in air was fed to the reactor. The hydrocarbon-air mixture contained 1.0 volume percent hydrocarbon. The feed rate through the reactor was 100 grams of butene-2 per liter of catalyst per hour. The contact time was 0.9 second. The maximum yield of maleic anhydride was obtained at a block temperature of 504° C. At this temperature the maximum yield was 62.8 weight percent maleic anhydride. However, after a few weeks of reaction the yield had fallen to about 55 percent and thereafter the yield decreased to a low level.

*Example 7*

Run 5 was repeated with the exception that lithium hydroxide was added as a stabilizer. The lithium hydroxide was added to the diluted aqueous solution of $H_3PO_4$ prior to the addition of the $NH_4VO_3$. The lithium hydroxide was added in an amount of 0.5 weight percent based on the combined weight of $H_3PO_4$ and $NH_4VO_3$. The addition of the lithium hydroxide stabilized the catalyst for a prolonged period similar to the run graphically illustrated.

When the above examples are repeated with other ethylenically unsaturated aliphatic hydrocarbons such as butadiene-1,3, butene-1, 3-methyl butene-1, isoprene, 2,3-dimethyl butadiene and like hydrocarbons containing from 4 to 6 carbon atoms, similar results are obtained with good yield of aliphatic dicarboxylic acid anhydrides including methyl and dimethyl maleic anhydride by using the above described catalysts prepared by depositing on carriers the described catalyst solutions consisting essentially of phosphorus, vanadium and alkali metal atoms in the prescribed ratios.

I claim:

1. An improved vanadium-phosphorus catalyst complex having long catalyst life comprising as its main active constituent from about 1.0 to 2.0 atoms of phosphorus per atom of vanadium and wherein the phosphorus present therein is stabilized with from 0.003 to 0.125 atom of an element of Group Ia of the Periodic Table per atom of phosphorus, said active constituent being present in catalytic amounts.

2. An improved vanadium-phosphorus catalyst complex having long catalyst life for the production of maleic anhydride by vapor phase oxidation comprising as its main active constituent from about 1.1 to 1.6 atoms of phosphorus per atom of vanadium and wherein the phosphorus present therein is stabilized by from 0.003 to 0.125 atom of an element of Group Ia of the Periodic Table per atom of phosphorus, said active constituent being present in catalytic amounts.

3. An improved vanadium-phosphorus catalyst complex having long catalyst life for the production of maleic anhydride by vapor phase oxidation comprising as its main active constituent from about 1.0 to 2.0 atoms of phosphorus per atom of vanadium and wherein the phosphorus present therein is stabilized by from about 0.01 to 0.060 atom of lithium per atom of phosphorus, said active constituent being present in catalytic amounts.

4. An improved vanadium-phosphorus catalyst complex having long catalyst life for the production of maleic anhydride by vapor phase oxidation comprising as its main active constituent wherein the atomic ratio of phosphorus to vanadium is from about 1.0 to 2.0 atoms of phosphorus per atom of vanadium and wherein the phosphorus present therein is stabilized by from 0.003 to 0.125 atom of an element selected from the group consisting of lithium, sodium, potassium and mixtures thereof per atom of phosphorus, said active constituents being present in catalytic amounts.

5. An improved vanadium-phosphorus catalyst complex having long catalyst life for the production of maleic anhydride by vapor phase oxidation comprising as its main active constituent wherein the atomic ratio of phosphorus to vanadium is from 1.1 to 1.6 atoms of phosphorus per atom of vanadium and wherein the phosphorus present therein is stabilized by from about 0.01 to 0.060 atom of an element selected from the group consisting of lithium, sodium, potassium and mixtures thereof per atom of phosphorus, said active constituent being present in catalytic amounts.

References Cited by the Examiner

UNITED STATES PATENTS

| | | | |
|---|---|---|---|
| 2,180,353 | 11/1932 | Foster | 23—234 |
| 2,206,377 | 7/1940 | Weiss | 260—346.8 |
| 2,691,037 | 10/1954 | Bellringer et al. | 260—465.9 |
| 2,773,838 | 12/1956 | Reid et al. | 260—246.8 |
| 2,773,921 | 12/1956 | Rylander et al. | 260—346.8 |

FOREIGN PATENTS 408,026   10/1942   Canada.

OSCAR R. VERTIZ, *Primary Examiner.*

MAURICE A. BRINDISI, R. M. DAVIDSON, A. J. GREIF, *Assistant Examiners.*